United States Patent [19]

Deblander

[11] Patent Number: 5,147,481
[45] Date of Patent: Sep. 15, 1992

[54] INSECT RESISTANT FOAM BODY USEFUL IN FARM BUILDINGS

[75] Inventor: Jean-Philippe Deblander, Mundolsheim, France

[73] Assignee: The Dow Chemical Company, Midland, Mich.

[21] Appl. No.: 746,849

[22] Filed: Aug. 19, 1991

[30] Foreign Application Priority Data

Aug. 24, 1990 [GB] United Kingdom ............... 9018640

[51] Int. Cl.$^5$ ..................... E04B 2/00; C08J 9/00
[52] U.S. Cl. ..................... 156/71; 428/304.4; 428/314.4; 521/79; 521/97; 521/98; 521/131; 521/155; 521/143; 521/146; 521/910
[58] Field of Search ............ 521/79, 143, 146, 155, 521/910; 156/71; 428/304.4, 314.4

[56] References Cited

U.S. PATENT DOCUMENTS

| | | | |
|---|---|---|---|
| 4,387,169 | 6/1983 | Zabrocki et al. | 521/79 |
| 4,438,224 | 3/1984 | Suh et al. | 521/146 |
| 4,801,484 | 1/1989 | Yao et al. | 521/143 |
| 4,810,570 | 3/1989 | Rutten et al. | 521/143 |
| 4,824,720 | 4/1989 | Malone | 521/143 |
| 4,931,484 | 6/1990 | Hovis | 521/143 |
| 4,990,542 | 2/1991 | Motani et al. | 521/143 |
| 5,007,765 | 4/1991 | Dietlein et al. | 404/74 |

Primary Examiner—Morton Foelak

[57] ABSTRACT

The invention is a plastic foam body which is resistant to the boring of insects and is useful in insulating buildings subject to such boring comprising a foamed thermoplastic polymer having a plurality of closed non-interconnecting cells, a minimum cross-sectional dimension of at least 30 mm, the foam body being without discontinuities and substantial variation in average cell size when cell size, wherein the foam body has a density, d, of 40 kg/m$^3$ or greater, and average cell dimensions of at least 1.0 mm, V, E, and H in three mutually perpendicular directions at least 1.0 mm or greater in the second directions, at least 1.0 mm and 0.9 mm respectively and a resistance factor, R, of 600 or greater as calculated by Formula 1

$$R = \frac{V \times E \times H}{(V \times E) + (V \times H) + (E \times H)} \times d^2. \quad \text{FORMULA 1}$$

In another embodiment the invention is a method of insulating buildings subject to the boring of insects into the insulation thereof using the plastic foam bodies of the invention.

7 Claims, No Drawings

INSECT RESISTANT FOAM BODY USEFUL IN FARM BUILDINGS

BACKGROUND OF INVENTION

The invention relates to a plastic foam bodies for use in insulation. More particularly, the foam bodies are resistant to insect, particularly beetle, attack. These foam bodies are especially useful in insulating farm buildings.

Many farm buildings used to house farm animals are insulated as it allows the farmer to control the environment to which the animals are exposed. Chicken coops and pigsties are among the farm buildings that are frequently insulated. This insulation is credited with improving the development conditions and health of the animals, as well as keeping energy bills low. Presently extruded thermoplastic foam boards, expanded thermoplastic bead boards and mineral wools are commonly used as insulation. Certain insects are found to bore into the insulating material and into the wood structures of such farm buildings. This results in the loss of insulation value of the insulation, and can result in severe structural damage to the farm buildings. One particularly damaging pest is a beetle, Alphitobius Diaperinus. This beetle bores into the insulation and wood structures to nest. This beetle is also known to carry diseases which are damaging to farm animals. Currently available insulating materials are susceptible to being bored into by such beetles.

Representative of plastic foam materials useful in insulation boards are those described in WO 9004615 and U.S. Pat. No. 4,085,073 (FR 2330719).

Kagaya Japan Patent Application 58-37819 discloses a heat insulating board for barns that consists of a foamed polystyrene whose average cell size (mm) and density (kg/m$^3$) belong in a pentagonal area (of a graph of density vs cell size established by the points A (.70, 45), B (.40, 45), C (0.10, 65), D (0.10, 85), and E (0.70, 85) whose surface hardness is higher than 70. The polystyrene foam boards disclosed are prepared via bubble extrusion. The method of preparing the boards described limits the thickness of prepared boards from 20 to 30 mm. This is disadvantageous as the insulation value of 20 to 30 mm thick board are not as high as may be desired. What is needed is an insulation board that can be fabricated in higher thicknesses which exhibits good insect resistance.

What is needed is an insulating material which is capable of preventing or resisting the boring of such insects into the insulating material. What is further needed is a method of preventing such insects from boring into the insulating material in farm buildings. What is further needed is a farm building which has insulating material which is resistant to the boring of such insects.

SUMMARY OF INVENTION

It has been discovered that by control of the density and dimensions of the cell size a plastic foam can be prepared which resists boring of insects into the plastic foam when used as insulation. The term Resistance, R, has been developed to define this phenomena, and is described by Formula 1. It has been further discovered that the light transmission properties of a plastic foam affect the foams resistance to boring by insects.

In one embodiment this invention is a method of preventing the destruction of insulation in the interior of a farm building useful for housing domestic animals which comprises affixing to the interior walls, the interior ceiling or both a plastic foam body comprising a foamed plastic polymer having a plurality of closed non-interconnecting cells, a minimum cross-sectional dimension of at least about 30 mm, and a water vapor permeability not greater than about 1.8 perm inches as measured by ASTM Method C-355-64, Procedures for Desiccant Method, said foam body being without discontinuities and substantial variation in average cell size when cell size is measured by averaging cell diameter across the minimum cross-sectional dimension of the body by ASTM Method D-2842-69, wherein the foam body has a density, d, of about 38 kg/m$^3$ or greater, and average cell dimensions V, E and H in three mutually perpendicular directions of at least about 1.0 mm, at least about 1.0 mm, and at least about 0.9 mm respectively and a resistant factor, R, of about 500 or greater as calculated by Formula 1.

$$R = \frac{V \times E \times H}{(V \times E) + (V \times H) + (E \times H)} \times d^2 \quad \text{FORMULA 1}$$

The resistance factor is calculated using the units of millimeters (mm) for V, E, and H and of kilograms per cubic meter (kg/m$^3$) for the density.

In a preferred embodiment the foam exhibits a light transmission of about 20 percent or greater when measured with a lux meter through a thickness of about 36 mm.

At least one commercial foam is available which meets the minimum requirements of this method. Jackofoam sells an extruded polystyrene foam under the Trademark, Jackodur ®, having a density of 39 kg/m$^3$, and cell dimensions of V=1.04, E=0.92, and H=1.22. This foam exhibits a resistance factor of 530, and a light transmission of 21 percent.

In another embodiment, a plastic foam body with significantly better insect resistance has been discovered, comprising a foamed plastic polymer having a plurality of closed non-interconnecting cells, a minimum cross-sectional dimension of at least about 30 mm, and a water vapor permeability not greater than about 1.8 perm inches as measured by ASTM Method C-355-64, Procedures for Desiccant Method, said foam body being without discontinuities and substantial variation in average cell size when cell minimum cross-sectional dimension of the body by ASTM Method D-2842-69, wherein the foam body has a density, d, of about 40 kg/m$^3$ or greater, and average cell dimensions V, E and H in three mutually perpendicular directions of at least about 1.0 mm, at least about 1.0 mm, and at least about 0.9 mm respectively, and a resistance factor, R, of 600 or greater, as calculated by Formula 1. In a preferred embodiment the light transmission of the foam is 20 percent or greater when measured with a lux meter through a thickness of 36 mm. In a more preferred embodiment the light transmission of the foam is 25 percent or greater when measured with a lux meter through a thickness of 36 mm. Formula 1 describes the relationship of resistance factor to the density and cell dimension of the plastic foam body.

In another embodiment the invention is a method of insulating a farm building useful for housing domestic animals which comprises affixing to the interior walls, the interior ceiling, or both plastic foam bodies of this invention.

In another embodiment the invention is an insulated farm building useful for housing farm animals which comprises a building which has affixed to the interior walls, the ceiling or both foam bodies of this invention.

In another embodiment of this invention the foam bodies of this invention have a light transmission of about 15% or greater as defined herein and a resistance factor of about 1000 or greater. In another embodiment the invention the foam bodies have a light transmission of about 10 or greater and a resistance factor of about 1200 or greater. The light transmission properties and resistance factor each independently prevent or resist boring of the insects. As either factor is increased, the level required of the other parameter to achieve good insect boring resistance properties is lower.

DETAILED DESCRIPTION OF THE INVENTION

Plastic polymers useful herein may be any thermoplastic or thermoset polymer which may be formed into a foam body with the properties defined herein and which provides insulation properties. Examples of polymers which may be used include polyurethanes, polyolefins, or polymers or copolymers derived from polymerizable alkenyl aromatic compounds. Processes for preparing such foam bodies are well-known in the art. The polyolefin or alkenyl aromatic based polymers preferably are formed by extrusion and have machine and transverse directions. The polyurethane foams are preferably formed by reaction injection molding.

The polymers or copolymers derived from polymerizable alkenyl aromatic compounds comprise in chemically combined form, at least about 50 percent by weight of at least one alkenyl aromatic compound having the general formula

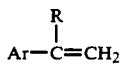

wherein Ar represents an aromatic hydrocarbon radical or an aromatic halo-hydrocarbon radical of the benzene series, which may be optionally substituted with a lower alkyl or alkenyl moiety, and R is hydrogen or the methyl radical. Examples of such alkenyl aromatic resins are the solid homopolymer of styrene, o-methylstyrene, m-methylstyrene, p-methylstyrene, ethylstyrene, vinylstyrene, chlorostyrene or bromostyrene, the solid copolymers of two or more of such alkenyl aromatic compounds with minor amounts of other readily polymerizable olefinic compounds such as methylmethacrylate, acrylonitrile, maleic anhydride, citraconic anhydride, itaconic anhydride, acrylic acid, rubber reinforced (either natural or synthetic) styrene polymers etc. Most preferred is polystyrene. Polyolefins useful in this invention comprise the reaction product of one or more olefins, straight or branched chain hydrocarbons with one or more carbon-carbon double bonds. Examples of such compounds include ethylene, propylene, butadienes, isoprene, and the like. Polymers of ethylene or propylene are preferred. The preferred classes of plastic polymers useful in this invention are the polyolefins and the polymers or copolymers derived from polymerizable alkenyl aromatic compounds, with the polymers or copolymers derived from polymerizable alkenyl aromatic compounds being most preferred.

The foam bodies of this invention have certain properties which inhibit or prevent the boring of insects, especially beetles into the foam bodies. Such properties include properties which make it difficult for the insects to bore into the foam. Foams of higher densities make it difficult for the insects to bore into the foam bodies. The foam bodies preferably have a density sufficiently high to prevent, or inhibit the beetles from boring into them. Preferably the foam bodies of this invention have a density of about 40 kg/m$^3$ or greater, and more preferably about 45 kg/m$^3$ or greater and most preferably about 50 kg/m$^3$ or greater. In the embodiment of the invention which is a method of preventing insects from boring into the insulation of a building useful for housing farm animals the minimum density of a foamed body which is useful is about 38 kg/m$^3$ or greater. It has been further discovered that foam bodies with larger cell sizes prevent or inhibit insects from boring into the foam bodies. Cell sizes are generally defined by the dimensions of the cells in the three directions. In the embodiment where the foam body is prepared by extrusion the first direction, V, is the vertical direction (thickness), the second direction, E, is the extrusion direction (length for foam bodies prepared via other means), and the third direction, H is the horizontal direction (width). Preferably the cell size in the first direction, V, is at least about 1.0 mm, more preferably at least about 1.2 mm, and most preferably at least about 1.4. Preferably the cell size in the second direction, E, is at least about 1.0 mm, more preferably at least about 1.2 mm, and most preferably at least 1.4. Preferably the cell size in the third direction, H, is at least about 0.9 mm, more preferably at least about 1.2 mm, and most preferably at least about 1.4. It is the combination of the cell size and the density which defines the resistance of the foamed body to the boring of insects. This is defined by the resistance factor, R, which is defined by Formula 1. The foamed bodies of this invention preferably have a resistance factor of at least about 600, more preferably 700, and most preferably at least about 800. Preferably the resistance factor is at least about 1500 or below, as a resistance factor above 1500 would be disadvantageous, as at such levels the foam bodies have a higher thermal conductivity and the insulation value is reduced. In the embodiment of the invention which is a method of preventing insects from boring into the insulation of a building useful for housing domestic animals the minimum resistance factor of a foamed body which may be used is at least about 500. Preferably the cells have a structure near that of a cube or sphere, i.e. near symmetrical structure. The closer the structure of the foamed bodies are to the symmetrical structure the more resistant the foamed bodies are to insect attack or boring. A measure of this property is the ratio of the average vertical dimension to the average extrusion dimension. Preferably this ratio is about 0.6 or greater, more preferably about 0.8 or greater, and most preferably about 0.9 or greater. This is also demonstrated by the first term of Formula 1, in particular $$\frac{V \times E \times H}{(V \times E) + (V \times H) + (E \times H)}.$$

Higher numbers represent shapes which are closer to symmetrical cell shapes, and indicate a more bore resistant foam. Preferably this number is about 0.30 or greater, more preferably about 0.35 or greater, and most preferably about 0.40 or greater. The foam bodies of this invention preferably have a skin which is also resistant to the boring of insects. Preferably the skin has a hardness of about 70 and more preferably of about 90. Surface hardness is measured using a rubber hardness tester (Kobunski Keiki, Type C), at 10 points with 20 cm intervals on the surface of the foamed board. The foam bodies may be of any thickness which provides insulation in a reasonably economic manner. Preferably the foam bodies have a thickness of about 30 mm or more, more preferably of about 30 to about 100 mm, even more preferably of from about 40 to 80 mm, and most preferably of from about 40 to 60 mm. In a preferred embodiment the foams of this invention exhibit a cross sectional area of at least about 51.6 cm$^2$.

In a preferred embodiment the extruded foam bodies are produced by the following procedure. The polymer, and any conventional additives, are melted, and the melt is mixed with a blowing agent composition to give a homogeneous mixture. Mixing is conventionally carried out at from 180° to 280° C., preferably from 200° to 240° C., under a pressure of from about 10 to about 250 bar. A continuous embodiment in which the mixing is carried out in a conventional single-screw or twin-screw extruder is preferred. The mixture is then let down to a pressure, which is sufficiently lower than the line pressure wherein the lower pressure allows the blowing agent to evaporate advantageously by extrusion though a die, and the blowing agent evaporates and the polymer expands. The resulting foam has a circular or rectangular cross-section, depending on the shape of the die, and stabilizes on cooling. It is preferable to cool the zone into which the foam body is extruded. This may be achieved by encasing the zone with a water jacket with ambient temperature flowing through the water jacket.

Generally, the preparation of alkenyl aromatic polymer foams is most conveniently performed in a manner generally as shown and described in U.S. Pat. No. 2,669,751 (incorporated herein by reference) wherein the volatile fluid blowing agent is injected into a heat-plastified polymer stream within an extruder. From the extruder the heat-plastified gel is passed into a mixer, the mixer being a rotary mixture wherein a studded rotor is enclosed within a housing which has a studded internal surface which intermeshes with the studs on the rotor. The heat-plastified gel from the extruder is fed into the inlet end of the mixer and discharged from the outlet end, the flow being in a generally axial direction. From the mixer, the gel passes through coolers such as are described in U.S. Pat. No. 2,668,751 incorporated herein by reference and from the coolers to a die which extrudes a generally rectangular board. A generally similar extrusion system and a preferred extrusion system is shown in U.S. Pat. No. 3,966,381 incorporated herein by reference.

It is preferable to prepare the foam bodies of this invention in the absence of any additives which cause nucleation of the polymer as this reduces the cell size of the foam body. It is also preferable relatively large amounts of blowing agent be used as this results in a larger cell size. It is also preferable to use relatively low line speeds to prepare the foam bodies so that the dimension in the extrusion direction is not significantly larger than the other dimensions.

The blowing agent, i.e. foaming agent, used herein can be any known in the art for blowing agent for thermoplastic foams. See for example U.S. Pat. Nos. 3,770,666; 4,311,636; 4,636,527; 4,438,224; 3,420,786; and 4,421,866 (all incorporated herein by reference). Examples of such blowing agents include commonly used liquid or gaseous organic compounds which do not dissolve the polymer and which have a boiling point below the softening point of the polymer. A wide variety of volatile fluid blowing agents which are carbon-containing compounds; that is, they have carbon chemically combined in their molecules, can be utilized in the practice of the present invention. They include such materials as the aliphatic or cycloaliphatic hydrocarbons including ethane, ethylene, propane, propylene, butane, butylene, isobutane, pentane, neopentane, isopentane, hexane, heptane cyclohexane and mixtures thereof, as well as chlorinated and fluorinated and halogenated hydrocarbons such as methylene chloride, dichlorodifluoromethane, 1-chloro-1,1-difluorethane, 1,1,1,2 tetrafluoroethane, 2-chloro 1,1,1,2-tetrafluoroethane, pentafluoroethane, 2,1,1,1-dichlorodifluoroethane or 1,2,2-trifluoro-1,1,2-trichloroethane may also be used.

Preferably the blowing agents which may be utilized generally exhibit a boiling point of not be greater than about 95° C. at about 100 kpA of mercury absolute pressure. Other useful fluid blowing agents are the perchlorofluorocarbons, and tetraalkyl silanes such as tetramethylsilane, trimethylsilane, trimethylisopropylsilane and trimethyl n-propylsilane, having a boiling point not higher than about 95° C. at about 100 kpA absolute pressure.

Mixtures of these blowing agents may also be employed. It is advantageous to use about 3 to about 18 percent by weight of blowing agent based on the polymer, and preferably about 5 to about 15 percent by weight of the polymer of the blowing agent.

In one preferred embodiment the blowing agent is a mixture comprising, from about 0 to about 97 weight percent ethyl chloride and from about 3 to about 100 weight percent of a fluorocarbon member selected from the group consisting of chlorodifluoromethane, 1-chloro-1,1-difluoroethane and mixtures thereof.

In one embodiment it is preferred to use an amount of carbon dioxide in admixture with one or more of the previously described blowing agents. The presence of $CO_2$ aids in the formation of the large cell sizes desired of the foam bodies. The amount of $CO_2$ used is that amount which aids in the formation of large cell sizes in the foam body. In a more preferred embodiment the blowing agent mixture used comprises from about 9 to about 9.5 percent by weight based on the polymer to be formed of 1 chloro-1,1-difluoroalkane, from about 1.5 to about 20 parts of chlorodifluoromethane, and from about 0.3 to about 0.6 parts of carbon dioxide.

It is preferable that the foam bodies of the invention demonstrate dimensional stability. More preferably the foam bodies shrink less than about 2 percent in any direction after extrusion.

In addition conventional assistants, fire retardant agents and compositions, lubricants, and fillers may also be employed.

The light transmission factor is measured as the amount of light a foam body of about 36 mm allows to pass through it as measured by a lux meter. The light transmission factor is expressed as the percentage of light given off by the light source which passes through the foam. This is measured by reading the level of light the light source generates directly with a lux meter, and then thereafter, measuring with a lux meter how much light from such a light source is passed through the foam body. The two measurements are compared and the light factor is expressed as the percentage of the light from the source which passes through the foam body. Many of the insects which bore into the insulation in the farm buildings do so to escape light. Thus the ability to pass light through the foam body reduces or inhibits the number of insects which are willing to bore through and into the foam bodies. Thus, white or translucent foams are preferred although lightly colored foams may be somewhat effective.

The foams of this invention may be applied to the inner walls, the ceiling, or both of any farm building which houses animals and which is subject to attack by insects. Methods for affixing the foam bodies to the walls and ceilings are well known to those skilled in the art. It is especially advantageous to use the foam bodies of the invention to insulate chicken coops and pigsties.

Insect damage to such farm buildings and the insulation therein may be prevented by insulating by using the foam bodies defined herein.

SPECIFIC EMBODIMENTS OF THE INVENTION

The following Examples are used to demonstrate the invention, and do not limit the scope of the claims. All parts and percentages are by weight unless otherwise stated.

PREPARATION OF POLYSTYRENE FOAM BODIES

Polystyrene, a fire retardant additive of 1 hexabromocyclodecane (HBCD), copper dye, and an extrusion aid are mixed. The mixture is heated until plastified, the temperature is shown in Table 1. The blowing agent mixture comprising 1,1,1 chlorodifluoroethane and ethyl chloride is added to the mixture and it is mixed to form a homogeneous mixture. The mixture is held at a super atmospheric pressures. The mixture is pushed through a die into a zone at atmospheric pressure and cooled to ambient temperature. The pressures and die temperatures are described in Table 1.

Determination of Cell Size

The number of walls present in a particular direction are counted for a determined length, L, usually 10 or 15 mm. The sample is usually examined under a microscope. The cell size is calculated from the Formula 2

$$\frac{L}{\text{No of Walls}} \times 1.62 = \text{cell size}$$

Procedure For Determining Insect Resistance

Boxes of transparent polystyrene, with a lid on top with breathing holes are used for the test. In to each box is placed a sample of foam 150×200 mm (there are 4 replicate of each test item). Into each box is placed larvae of Alphitobius Diaperinus beetles and sufficient feeding bran cover the bottom of the box with a layer of 5 to 15 mm. The box is humidified at 25 percent. The samples are weighed and their volume determined prior to the test. The boxes are maintained in a room at 25° C. with a relative humidity of 70 percent. Artificial light is provided for 14 hours and no light is provided for 10 hours. After 30 days the larvae are removed and the volume and weight of the samples are measured. The volume loss is measured by measuring the amount of water which is placed into the bore holes using an injection needle. The measurements are performed three times each and the average loss is reported. The samples are then weighed. The weight loss and volume loss are determined, the results are compiled in Table 2.

TABLE 1

| | EXAMPLES* | | | | | | | | | | | | |
|---|---|---|---|---|---|---|---|---|---|---|---|---|---|
| | 1** | 2 | 3** | 4** | 5 | 6 | 7** | 8** | 9** | 10 | 11 | 12 | 13 |
| Additives | 1.48 | 1.28 | 1.48 | 1.68 | 1.88 | 1.88 | 1.88 | 1.88 | 1.88 | 1.68 | 1.48 | 1.28 | 1.28 |
| Ethyl Chloride[2] | 3 | 3 | 6 | 4.5 | 4.5 | 4.5 | 4.5 | 4.5 | 3 | 6 | 6 | 6 | 6 |
| HCFC 142-b[1, 2] | 10 | 10 | 5 | 7.5 | 7.5 | 7.5 | 7.5 | 7.5 | 10 | 5 | 5 | 5 | 5 |
| Extrusion Pressure[3] | 129.6 | 155.8 | 152.9 | 120.6 | 134.2 | 131.5 | 123.5 | 119.4 | 113.7 | 124.2 | 124.2 | 131.7 | 108.2 |
| Temperature[4] | 119.9 | 108.9 | 119.4 | 110.4 | 109.9 | 110.9 | 113 | 111.4 | 116.9 | 109 | 109 | 107.4 | 127.9 |
| Density Kg/m | 37 | 47.3 | 37 | 40.8 | 49.7 | 47.9 | 40.9 | 40.5 | 35 | 52.2 | 50.6 | 49.1 | 37.2 |
| Cell size V mm | 1.3 | 0.98 | 1.05 | 1.0 | 1.4 | 1.2 | 1.1 | .075 | 0.82 | 1.5 | 1.5 | 1.05 | 1.5 |

[1]1-chloro-1,1-difluoroethane
[2]Units pph
[3]Units Bar
[4]Units °C.
*All parts based on 100 parts polystyrene
**Comparative Examples

TABLE 2

| Example | Color | Cell Size mm | | | Density Kg/m³ | Skin Hardness | Resistance Factor | Weight Start (g) | | | | Weight Finish (g) | | | | Weight loss (g) | |
|---|---|---|---|---|---|---|---|---|---|---|---|---|---|---|---|---|---|
| | | V | E | H | | | | | | | | | | | | Avg | largest |
| 1*' | Blue | 1.25 | 1.08 | 0.85 | 37.2 | — | 74 | 477 | 34.21 | 34.21 | 34.66 | | | | | | |
| 2 | Blue | 0.90 | 0.85 | 1.08 | 47.3 | 77 | 697 | 52.29 | 51.75 | 52.10 | 51.69 | 49.40 | 50.05 | 49.8 | 48.15 | 5.02 | 6.85 |
| 3*' | Blue | 0.81 | 0.62 | 1.01 | 36.7 | 77 | 352 | 45.69 | 45.69 | 45.66 | 45.63 | | | | | | |
| 4' | Blue | 0.81 | 0.68 | 0.74 | 40.8 | 82 | 409 | 62.23 | 60.45 | 60.63 | 60.59 | 51.72 | 52.31 | 54.97 | 57.05 | 10.69 | 14.13 |
| 5 | Blue | 1.08 | 0.74 | 0.81 | 48.9 | 83 | 680 | 62.99 | 62.94 | 63.02 | 63.20 | 61.27 | 61.12 | 60.92 | 60.05 | 3.49 | 4.98 |
| 6 | Blue | 1.08 | 0.95 | 0.81 | 48.7 | 85 | 739 | 60.33 | 60.45 | 60.42 | 60.19 | 58.40 | 58.05 | 58.7 | 57.82 | 3.49 | 3.97 |
| 7' | White | 1.01 | 0.74 | 0.90 | 41.1 | 83 | 489 | 66.10 | 66.19 | 66.07 | 65.92 | 58.40 | 58.05 | 58.70 | 57.82 | 5.74 | 7.42 |
| 8*' | White | 0.62 | 0.54 | 0.62 | 39.7 | 82 | 311 | 66.84 | 66.79 | 66.72 | 66.50 | | | | | | |
| 9*' | White | 0.81 | 0.62 | 0.74 | 34.9 | 78 | 290 | 63.65 | 63.64 | 63.81 | 63.81 | | | | | | |
| 10 | White | 2.31 | 1.25 | 1.62 | 52.3 | 87 | 1477 | 84.88 | 85.32 | 85.26 | 85.01 | 83.25 | 83.75 | 83.35 | 82.6 | 2.21 | 2.83 |
| 11 | White | 2.31 | 1.35 | 1.62 | 50.4 | 91 | 1419 | 92.79 | 92.80 | 92.03 | 92.56 | 90.50 | 90.90 | 89.35 | 90.15 | 2.51 | 2.91 |
| 12 | White | 1.16 | 0.90 | 1.01 | 48.8 | 87 | 804 | 78.15 | 78.29 | 78.41 | 78.58 | 76.70 | 76.65 | 76.37 | 77.00 | 2.14 | 2.60 |

TABLE 2-continued

| Example | Color | Cell Size mm V | E | H | Density Kg/m³ | Skin Hardness | Resistance Factor | Weight Start (g) | | | | Weight Finish (g) | | | | Weight loss (g) Avg | largest |
|---|---|---|---|---|---|---|---|---|---|---|---|---|---|---|---|---|---|
| 13 | White | 2.03 | 1.8 | 1.62 | 37.7 | 75 | 853 | 41.65 | 41.76 | 41.82 | 41.82 | 38.6 | 39.8 | 39.4 | 35.55 | 8.2 | 14.99 |

*Larvae infestation is so bad that the samples crumble so a final weight cannot be accuraely determined
'Comparative Examples

EXAMPLES 14 TO 17

Two different sets of four foams are exposed to the same conditions as described above with the exception that one is placed in total darkness, 2 Lux, and the other is placed in light, about 500 lux, for the complete test. After 2 months the beetles are removed from the samples and the number of holes counted. One foam in each test is blue and the other is white. The results are compiled in Table 3.

TABLE 3

| | Example | | | |
|---|---|---|---|---|
| | 14 | 15 | 16' | 17' |
| Color | Blue | White | Blue | White |
| Density kg/m³ | 49 | 49 | 41 | 41 |
| Cell Size mm (Vertical direction) | 1.08 | 1.16 | 0.81 | 1.00 |
| Light Factor | 5.6 | 33 | 6.8 | 28 |
| Resistance Factor | 739 | 804 | 409 | 489 |
| No. of Holes Light | 20 | 8 | 189 | 44 |
| No. of Holes Dark | 29 | 19 | 115 | 23 |

'Comparative Examples

What is claimed is:

1. A method of insulating a building useful for housing farm animals which comprises affixing to the interior walls, the interior ceiling or both a plastic foam body comprising a foamed plastic polymer having a plurality of closed non-interconnecting cells, a minimum cross-sectional dimension of at least about 30 mm, and a water vapor permeability not greater than about 1.8 perm inches as measured by ASTM Method C-355-64, Procedures for Desiccant Method, said foam body being without discontinuities and substantial variation in average cell size when cell size is measured by averaging cell diameter across the minimum cross-sectional dimension of the body by D-2842-69, wherein the foam body has a density d, of about 38 kg/m³ or greater, and average cell dimensions V, E, and H in three mutually perpendicular directions of at least about 1.0 mm, at least about 1.0 mm, and at least about 0.9 mm respectively, and a resistance factor, R, of about 500 or greater, as calculated by Formula 1

$$R = \frac{V \times E \times H}{(V \times E) + (V \times H) + (E \times H)} \times d^2. \quad \text{FORMULA 1}$$

2. A method according to claim 1 wherein the foam body has a density of about 40 kg/m³ or greater a resistance factor, R, of about 600 or greater, and a light transmission of about 20 percent or greater.

3. A method according to claim 2 wherein the light transmission of the foam body is about 25 or greater.

4. A method according to claim 3 wherein the foam body has a resistance factor of about 700 or greater.

5. A method according to claim 4 wherein the density is about 45 kg/m² or greater.

6. A method according to claim 5 wherein the thermoplastic polymer comprises an alkenyl aromatic polymer, a polyurethane or a polyolefin.

7. A method according to claim 6 wherein the thermoplastic polymer comprises polystyrene.

* * * * *